United States Patent [19]

Valdes Marin

[11] Patent Number: 5,054,514

[45] Date of Patent: Oct. 8, 1991

[54] DRINKING FOUNTAIN CARTRIDGE VALVE

[75] Inventor: Osvaldo Valdes Marin, Santiago, Chile

[73] Assignee: Plumbmaster, Inc., Irving, Tex.

[21] Appl. No.: 356,708

[22] Filed: May 25, 1989

[51] Int. Cl.$^5$ ............................................. F16K 27/00
[52] U.S. Cl. ............................ 137/454.2; 137/614.11; 251/121; 251/321
[58] Field of Search ............ 137/454.2, 454.6, 625.17, 137/614.11, 614.18, 614.19; 251/121, 900, 321

[56] References Cited

U.S. PATENT DOCUMENTS

| | | | |
|---|---|---|---|
| 1,290,583 | 1/1919 | Kruecke | 251/121 X |
| 1,793,292 | 2/1931 | Taylor. | |
| 2,688,975 | 9/1954 | Born | 251/900 X |
| 2,963,259 | 12/1960 | Heyer et al. | 137/454.2 X |
| 3,003,519 | 10/1961 | Homeyer et al. | |
| 3,052,258 | 9/1962 | Keller, III. | |
| 3,166,500 | 1/1965 | Noakes et al. | 251/121 |
| 3,279,495 | 9/1966 | Taylor. | |
| 3,493,010 | 2/1970 | Dreibelbis. | |
| 3,538,942 | 11/1970 | Lyall. | |
| 3,902,600 | 9/1975 | Turner et al. | 137/454.6 |
| 4,056,124 | 11/1977 | Goldsmith | 137/625.17 |
| 4,175,586 | 11/1979 | Hayman | 137/454.6 X |
| 4,250,912 | 2/1981 | Knapp | 137/454.6 X |
| 4,377,176 | 3/1983 | Schopper et al. | 251/900 X |
| 4,481,971 | 11/1984 | Farrell et al. | 137/454.6 |
| 4,576,195 | 3/1986 | Dreibelbis | 137/454.6 |

FOREIGN PATENT DOCUMENTS 2647909 5/1977 Fed. Rep. of Germany ..................... 137/625.17

Primary Examiner—Stephen M. Hepperle
Attorney, Agent, or Firm—Bernard A. Reiter

[57] ABSTRACT

Disclosed is a cartridge-type flow control valve principally for use in public drinking fountains. The cartridge-type valve includes a substantially cylindrical housing open at one end. Mounted within the housing is a fluid transfer member which includes an integrally formed fluid transfer chamber, inlet nozzle and outlet nozzle. A valve stem slidably extends into the fluid transfer chamber and is sealed by means of O-rings. The valve stem includes a substantially cylindrical eccentric protrusion which can be used to regulate the amount of flow through the cartridge valve. The eccentric protrusion is adjacent to the inlet bore to the fluid transfer chamber and thus, by rotating the valve stem, the gap between the eccentric protrusion and the inner wall of the fluid transfer chamber at the inlet bore can be varied. Varying this gap allows some amount of flow control.

The valve stem has attached thereto a valve stem cap. There is integrally formed with the valve stem cap a coiled section which acts in conjunction with the steel spring surrounding the valve stem to drive the valve stem into closed position when pressure is released from the valve stem.

9 Claims, 1 Drawing Sheet

DRINKING FOUNTAIN CARTRIDGE VALVE

BACKGROUND OF THE INVENTION

1. Field of the Invention

This invention relates generally to liquid dispensing systems and more particularly to cartridge-type flow control valves for use in public drinking fountains.

2. Description of the Prior Art

There are a number of shut-off type control valves for use in drinking fountains known in the prior art. Among them is a control valve taught by Homeyer in the U.S. Pat. No. 3,003,519. Homeyer teaches a rather complicated valve wherein when the push-bottom is pressed the valve stem is driven downward to create a gap between the valve head and the valve seat. Homeyer relies on a diaphragm to divide the upper portion of the valve from the lower portion with the valve stem extending therethrough.

U.S. Pat. No. 3,166,500 to Noakes et al teaches a drinking water cartridge valve which incorporates the use of a ball valve element. The valve is actuated by driving the valve stem downward to displace the ball from the valve seat.

U.S. Pat. No. 3,493,010 to Dreibelbis teaches a valve cartridge wherein the valve stem is used to drive the valve head downwards so that it disengages from the seat thus allowing water to flow through the valve. Dreibelbis further incorporates a diaphragm defining the upper and lower portions of the valve.

Yet another cartridge type control valve is depicted in U.S. Pat. No. 3,902,600 to Turner et al. It's design and operation is similar to those previously discussed. There is a diaphragm through which a valve stem extends. Pressing down on that valve stem causes the valve head to disengage from the seat allowing the water to flow.

Still another cartridge control valve is taught in the U.S. Pat. No. 4,576,195 to Dreibelbis. It includes a cup like member having an elastomeric diaphragm through which the valve stem extends. As within some of the other designs discussed above, driving the valve stem downward causes the valve head to displace from the valve seat.

None of the references teach a monolithic bottom wall component having incorporated therein both the inlet and outlet nozzles as well as a transverse leg component for delivering fluid from the fluid transfer chamber to the outlet nozzle. Further, none of the references teach a valve stem having O-rings adjacent to the valve bore to provide sealing of the valve stem within the valve bore without the need of a diaphragm. Further none of the references cited teach a housing member which receives the housing of the fluid transfer chamber and provides a water reservoir between the inlet nozzle and the fluid transfer chamber. Also, none of the references cited teach a valve stem cap which has an integrally formed coiled plastic section to aid in bringing the valve head back to seated position when pressure is released on the valve stem.

SUMMARY OF THE INVENTION

It is an object of the present invention is to provide a drinking fountain cartridge valve having an integrally formed bottom wall, inlet nozzle outlet nozzle, a fluid transfer chamber and conduit for delivering water from the fluid transfer chamber to the outlet nozzle.

Another object of the present invention is to provide a valve stem cap for a drinking water cartridge valve which has an integrally formed coiled plastic spring section.

Still another object of the present invention is to provide an O-ring sealing means between the valve stem and valve bore to create therebetween the fluid transfer chamber.

Yet a further object of the present invention is to provide a housing which engages the bottom wall means to enclose the fluid transfer chamber and provide a water reservoir between the inlet nozzle and the fluid transfer chamber.

Still another object of the present invention is to provide a cartridge valve which is readily adjustable to regulate the amount of flow.

Briefly stated, the foregoing and numerous other features, objects and advantages of the present invention will become readily apparent upon reading the detailed description, claims and drawings set forth hereinafter. These features, objects and advantages are accomplished with the construction of a cartridge valve of non-metallic material and, preferably, plastic material of such design that the bottom wall, inlet nozzle, outlet nozzle and fluid transfer chamber can be monolithically manufactured by injection molding or similar process. The valve stem extends downward into the fluid transfer chamber and engages the inside walls of the fluid transfer chambers by means of O-rings. As the valve stem is depressed, the lower O-ring disengages from the inner wall of the fluid transfer chamber allowing water to flow from the inlet nozzle through the fluid transfer chamber and the outlet nozzle. As the valve stem is released, a stainless steel spring and a plastic spring integrally formed with the valve steam cap to pull the valve stem upward such that the lower O-ring again engages the inner wall of the fluid transfer chamber shutting of the flow.

The monolithic design of the lower portion of the present invention yields a cartridge valve with an economy of parts. Including the O-rings and the lower gasket for sealing engagement with the drinking fountain, there is a total of ten parts. The O-rings, bottom gasket and spring account for six of these parts. This economy of parts yields a very desirable result of having a minimum of seams within the valve through which leaking could occur.

DESCRIPTION OF PREFERRED EMBODIMENT

Figure 1:
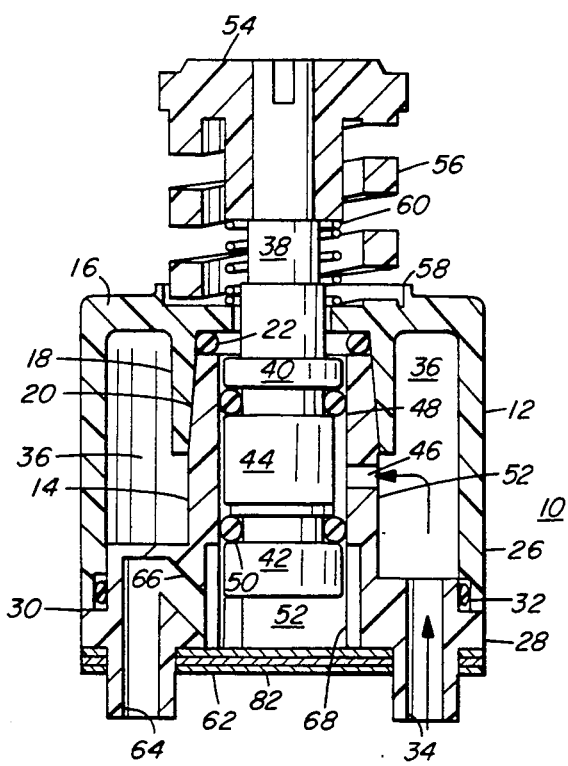
FIG. 1. is a cross sectional view of the cartridge value of the present invention shown in the normal closed position. In the illustrated position the valve is also in the maximum flow setting.

Turning first to FIG. 1 there is shown the drinking fountain cartridge value 10 of the present invention in cross section. The cartridge valve 10 includes a cylindrical housing 12 in which fluid transfer member 14 resides. Extending downward from the top wall 16 of cylindrical housing 12 is valve bore receptacle 18. Valve bore receptacle 18 is generally cylindrical with a tapered inner wall 20 for receiving the tapered upper section 22 of fluid transfer member 14. An O-ring 24 provides a seal between the upper wall 16 of cylindrical housing 12 and the upper portion 22 of fluid transfer member 14.

Cylindrical housing 12 is provided with an annular step 26 at its open end where it receives the lower portion 28 of fluid transfer member 14. There is an annular ridge 30 extending from fluid transfer member 14 which serves as a support for cylindrical housing 12. An O-ring 32 is located beneath annular step 26 to provide a seal between cylindrical housing 12 and the lower portion 28 of fluid transfer member 14.

There is a bore 34 through the lower portion 28 of valve bore member 14 which allows fluid to flow into the valve 10 of the present invention. Flow is from bore 34 into reservoir 36.

Extending downward into fluid transfer member 14 is valve stem 38. Valve stem 38 is substantially cylindrical and includes annular, concentric protrusions 40 and 42. Residing between annular, concentric protrusions 40 and 42 is flow control member 44. Flow control member 44 is an eccentric, cylindrical protrusion from valve stem 38. There is a hole 46 provided in fluid transfer member 14 adjacent to flow control member 44. An O-ring 48 encircles valve stem 38 between annular concentric protrusion 40 and flow control member 44. An O-ring 50 encircles valve stem 38 between flow control member 44 in angular concentric protrusion 42. O-rings 48 and 50 provide a sealing relationship between valve stem 38 and fluid transfer member 44. The inner walls of fluid transfer member 14 define a fluid transfer chamber 52.

Mounted to the top of valve stem 38 is valve stem cap 54 which has an integrally formed coiled plastic section 56 extending downward to engage the upper wall portion 16 of cylindrical housing 12. There is provided a cylindrical depression 58 in upper wall 16 which receives the integrally formed coiled plastic section 56. The cylindrical depression 58 is provided with a series of radially extending ridges to prevent undesired rotation of valve stem 38. A steel spring 60 resides between the upper wall 16 of cylindrical 12 and valve stem cap 54. When valve stem 54 is depressed, enough force must be applied to overcome the resistance of steel spring 60 and integrally formed coiled plastic section 58. In such manner, water flows from the source through inlet nozzle 34, reservoir 36, hole 46, fluid transfer chamber 52, transverse leg 62 and outlet nozzle 64. Transverse leg 62 and outlet nozzle 64 are integrally formed with fluid transfer member 14.

As valve stem cap 54 is depressed driving valve stem 38 downward, O-ring 50 passes shoulder 66 such that the seal between the valve stem 38 and the inside wall of the fluid transfer member 14 is disengaged thus allowing the water to flow around the fluid transfer chamber 52, and onto the bore of transverse leg 62 outside O-ring 50 and into the bore or transverse leg 52 and exit outlet nozzle 64. That portion of fluid transfer member 14 below shoulder 66 is provided with integrally formed longitudinal ridges 68 which allow O-ring 50 to remain centered within fluid transfer member 14 when valve stem 38 is driven downward to open flow through the cartridge valve 10 of the present invention.

Figure 2:
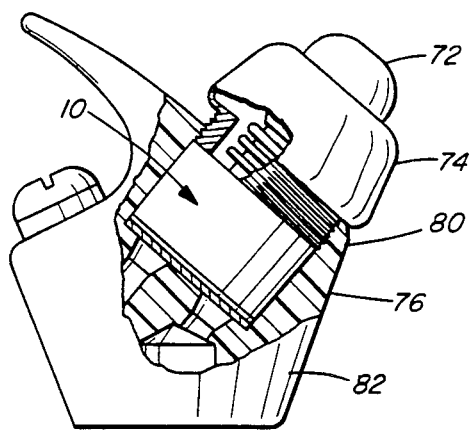
FIG. 2. is a side view of a dispensing head for a fluid dispensing system such as a drinking fountain partially in vertical section to show the cartridge valve of the present invention in assembled position.
Figure 3:
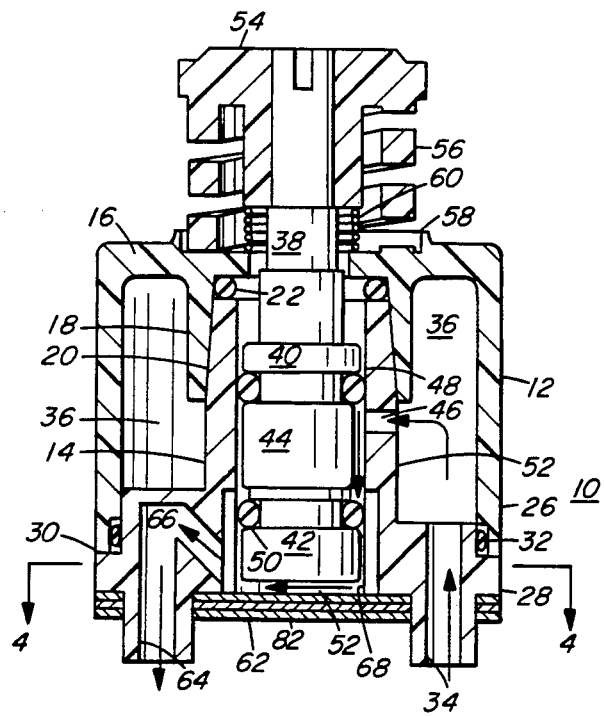
FIG. 3. is a cross sectional view of the cartridge value of the present invention in the open position again illustrated with the valve adjusted for a maximum flow setting.
Figure 4:
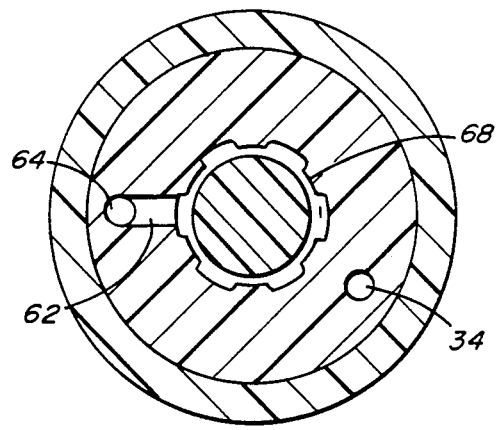
FIG. 4. is a cross sectional view of the cartridge valve of the present invention taken along A—A of FIG. 3.

The cartridge valve 10 of the present invention is designed to reside in a typical water fountain dispensing head 76 as depicted in FIG. 2. That dispensing head 76 includes a push-button 72 upon which force can be exerted to drive valve stem cap 54 downward. Push-button 72 resides in push-button container 74 which threadably engages locking nut 80. Locking nut 80 further threadably engages the dispensing head 76. A gasket 82 is provided between the bottom of cartridge valve 10 and dispensing head 76.

As noted above, flow control member 44 is an eccentric, cylindrical protrusion. FIG. 1 shows flow control member 44 set in the maximum flow position. The maximum flow position is the point where the gap is greatest between flow control member 44 and hole 46. That gap can be varied and thus, flow can be regulated, by rotating valve stem 38. Rotating valve stem 38 180° from the position shown would achieve the minimum flow setting. Once the desired position for flow control member 44 is selected, the ridges in cylindrical depression 58 aid in preventing rotation of valve stem 38 during normal operation.

From the foregoing, it will be seen that this invention is one well adapted to obtain all the ends and objects hereinabove set forth, together with other advantages which are inherent to the apparatus.

It will be understood that certain features and sub-combinations are of utility and may be employed with reference to other features and sub-combinations. This is contemplated by and is within the scope of the claims.

As many possible embodiments may be made of the invention without departing from the scope thereof, it is to be understood that all matter herein set forth or shown in the accompanying drawings is be interpreted as illustrative and not in a limiting sense.

What is claimed is:

1. A cartridge-type control valve comprising:
   (a) a fluid transfer member integrally formed with an outlet nozzle and an inlet nozzle;
   (b) a valve stem slidably extending into said fluid transfer member;
   (c) a substantially cylindrical flow control member eccentrically protruding from said valve stem;
   (d) a housing open at one end and having a cylindrical receptacle integrally formed therein receiving said fluid transfer member; and
   (e) a valve stem cap affixed to said valve stem, said valve stem having an integrally formed coiled section.

2. A cartridge-type control valve as recited in claim 1 wherein:
   said wall means is integrally formed with said substantially cylindrical housing.

3. A cartridge-type control valve comprising:
   (a) a substantially cylindrical housing open at a first end and having a wall means at a second end;
   (b) a substantially cylindrical receptacle within said substantially cylindrical housing, said substantially cylindrical receptacle extending from said wall means;
   (c) a fluid transfer member attached to said substantially cylindrical receptacle;
   (d) a valve stem slidably extending into said fluid transfer member, said valve stem including a substantially cylindrical eccentric protrusion for regulating flow through said transfer member; and (e) a valve stem cap affixed to said valve stem, said valve stem having an integrally formed coiled section.

4. A cartridge-type control valve as recited in claim 3 further comprising:
   (a) seal means for sealingly engaging said valve stem within said fluid transfer member;
   (b) a shoulder means within said fluid transfer member so that when said valve stem is driven downward, said seal means passes said shoulder means thereby no longer sealingly engaging said fluid transfer member.

5. A cartridge-type control valve as recited in claim 3 further comprising:
   longitudinal ridges extending from said shoulder to maintain said seal means centered within said fluid transfer member when said valve stem is driven downward.

6. A cartridge-type control valve comprising:
   (a) a substantially cylindrical housing open at a first end and having a wall means at a second end;
   (b) a substantially cylindrical receptacle within said substantially cylindrical housing, said substantially cylindrical receptacle extending from said wall means;
   (c) a fluid transfer member attached to said substantially cylindrical receptacle;
   (d) a valve stem slidably extending into said fluid transfer member, said valve stem including a substantially cylindrical eccentric protrusion for regulating flow through said transfer member; and
   (e) a spring means residing around said valve stem and between said valve stem cap and said wall means.

7. A cartridge-type control valve comprising:
   (a) a substantially cylindrical housing open at a first end and having a wall means at a second end;
   (b) a substantially cylindrical receptacle within said substantially cylindrical housing, said substantially cylindrical receptacle extending from said wall means;
   (c) a fluid transfer member attached to said substantially cylindrical receptacle;
   (d) a valve stem slidably extending into said fluid transfer member, said valve stem including a substantially cylindrical eccentric protrusion for regulating flow through said transfer member;
   (e) a spring means residing around said valve stem and between said valve stem cap and said wall means;
   (f) an annular depression in said wall means for receiving said integrally formed coiled section; and
   (g) a series of ridges in said annular depression for resisting rotational movement of said integrally formed coil section and said valve stem.

8. A cartridge-type control valve comprising:
   (a) a cylindrical housing open at the first end and having a wall means at a second end;
   (b) a fluid transfer member having proximal and distal ends, said proximal end being fixed to said wall means and said distal end being affixed to said first end of said cylindrical housing;
   (c) a valve stem slidably extending into said fluid transfer member, said valve stem including a substantially cylindrical eccentric protrusion for regulating flow through said fluid transfer member; and
   (d) a valve stem cap affixed to said valve stem, said valve stem having an integrally formed coiled section.

9. A cartridge-type control valve is recited in claim 8 wherein:
   said fluid transfer member includes an integrally formed fluid transfer chamber, inlet nozzle and outlet nozzle.

* * * * *